(12) United States Patent
Hareyama et al.

(10) Patent No.: US 11,365,696 B2
(45) Date of Patent: Jun. 21, 2022

(54) VEHICLE CONTROLLER, METHOD, AND COMPUTER PROGRAM FOR CONTROLLING VEHICLE

(71) Applicant: TOYOTA JIDOSHA KABUSHIKI KAISHA, Aichi-ken (JP)

(72) Inventors: Yohei Hareyama, Ninomiya-machi (JP); Daiki Yokoyama, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/227,380

(22) Filed: Apr. 12, 2021

(65) Prior Publication Data
US 2021/0332766 A1 Oct. 28, 2021

(30) Foreign Application Priority Data
Apr. 24, 2020 (JP) .............................. JP2020-077108

(51) Int. Cl.
*F02D 41/02* (2006.01)
*G06N 20/00* (2019.01)

(52) U.S. Cl.
CPC .......... *F02D 41/021* (2013.01); *G06N 20/00* (2019.01); *F02D 2200/70* (2013.01)

(58) Field of Classification Search
CPC .... F02D 41/021; F02D 2200/70; G06N 20/00
See application file for complete search history.

(56) References Cited

U.S. PATENT DOCUMENTS

| 11,004,037 | B1* | 5/2021 | Ling | G06Q 10/101 |
| 2017/0236060 | A1* | 8/2017 | Ignatyev | G06N 20/00 706/46 |
| 2019/0212323 | A1* | 7/2019 | Gupta | G16C 20/20 |
| 2019/0235481 | A1* | 8/2019 | Takigawa | H01S 5/0683 |
| 2019/0311262 | A1 | 10/2019 | Nagasaka et al. | |
| 2020/0096982 | A1* | 3/2020 | Mittal | G05B 19/41885 |
| 2020/0201282 | A1* | 6/2020 | Wang | G06Q 50/04 |
| 2020/0202253 | A1* | 6/2020 | Tamura | G06N 20/00 |
| 2020/0225655 | A1* | 7/2020 | Cella | G06N 3/0472 |
| 2020/0250270 | A1* | 8/2020 | Yu | G06N 20/00 |
| 2020/0327371 | A1* | 10/2020 | Sharma | G06N 5/04 |
| 2020/0348662 | A1* | 11/2020 | Cella | G05B 23/024 |
| 2021/0157312 | A1* | 5/2021 | Celia | G06N 20/00 |
| 2021/0248417 | A1* | 8/2021 | Taya | G01N 30/88 |
| 2021/0318202 | A1* | 10/2021 | Livesay | G06F 21/44 |

FOREIGN PATENT DOCUMENTS

JP 2019183698 A 10/2019

\* cited by examiner

*Primary Examiner* — Joseph J Dallo
(74) *Attorney, Agent, or Firm* — Hauptman Ham, LLP (57) ABSTRACT

A vehicle controller includes a processor configured to input an operating-condition parameter indicating an operating condition of a device into a learning model to calculate a control parameter indicating a control condition for causing the device to perform a desired operation corresponding to the operating-condition parameter; correct the control parameter so as to achieve the control condition, based on a feedback value depending on an operation evaluating value; control the device in accordance with the control parameter when a predetermined accuracy condition concerning accuracy of control of the device performed in accordance with the control parameter is satisfied, and controls the device in accordance with the corrected control parameter when the predetermined accuracy condition is not satisfied.

5 Claims, 5 Drawing Sheets

VEHICLE CONTROLLER, METHOD, AND COMPUTER PROGRAM FOR CONTROLLING VEHICLE

RELATED APPLICATIONS

The present application claims priority of Japanese Patent Application No. 2020-077108 filed Apr. 24, 2020, the disclosure of which is hereby incorporated by reference herein in its entirety.

FIELD

The present invention relates to a vehicle controller, a method, and a computer program for controlling a vehicle.

BACKGROUND

A technique has been proposed to apply a machine learning system in order to control a vehicle (e.g., see Japanese Unexamined Patent Publication No. 2019-183698).

For example, Japanese Unexamined Patent Publication No. 2019-183698 discloses a vehicle-mounted electronic control unit that acquires a learning-use data set indicating relationships between engine speeds, engine load factors, air-fuel ratios and ignition timings of an engine, HC or CO concentrations of exhaust gas flowing into an exhaust purification catalyst, and temperatures of the exhaust purification catalyst. The electronic control unit trains a neural network to learn weights thereof, using the acquired engine speeds, engine load factors, air-fuel ratios and ignition timings of the engine, and HC or CO concentrations of the exhaust gas as input parameters of the neural network and using the acquired temperatures of the exhaust purification catalyst as training data. The electronic control unit then uses the trained neural network to estimate the temperature of the exhaust purification catalyst.

SUMMARY

The use of an appropriately and sufficiently trained machine learning system allows a vehicle controller to improve the accuracy of control of a vehicle. However, the use of an insufficiently or inappropriately trained machine learning system does not necessarily improve the accuracy of control of a vehicle.

It is an object of the present invention to provide a vehicle controller that can achieve sufficient accuracy of control even with an insufficiently trained learning model used for controlling a device of a vehicle.

According to an aspect, a vehicle controller for controlling a predetermined device of a vehicle is provided. The vehicle controller includes a processor configured to: input at least one operating-condition parameter indicating an operating condition of the device into a learning model to calculate a control parameter indicating a control condition for causing the device to perform a desired operation corresponding to the at least one operating-condition parameter; correct the control parameter so as to achieve the control condition, based on a feedback value depending on an operation evaluating value representing an actual operation of the device; and calculate the feedback value depending on the operation evaluating value. The processor is further configured to determine whether accuracy of control of the device performed in accordance with the control parameter satisfies a predetermined accuracy condition; control the device in accordance with the control parameter when the predetermined accuracy condition is satisfied; and control the device in accordance with the corrected control parameter when the predetermined accuracy condition is not satisfied.

The processor of the vehicle controller preferably determines whether the device performs the desired operation in accordance with the corrected control parameter, based on the operation evaluating value, and stores a combination of the control parameter or the corrected control parameter and the at least one operating-condition parameter used for calculating the control parameter in a memory as a piece of training data when the device performs the desired operation. The processor is further configured to train, when the number of pieces of training data stored in the memory is not less than a predetermined number, the learning model by using the predetermined number of pieces of training data stored in the memory, thereby updating the learning model, wherein after updating the learning model, the processor calculates the control parameter with the updated learning model.

In the vehicle controller, preferably, the device is an internal combustion engine; the control parameter is a target value of torque outputted from the internal combustion engine; and the at least one operating-condition parameter includes at least one parameter among atmospheric temperature around the vehicle, humidity around the vehicle, and altitude of the location of the vehicle.

According to another aspect, a method for controlling a predetermined device of a vehicle is provided. The method includes: inputting at least one operating-condition parameter indicating an operating condition of the device into a learning model to calculate a control parameter indicating a control condition for causing the device to perform a desired operation corresponding to the at least one operating-condition parameter; correcting the control parameter so as to achieve the control condition, based on a feedback value depending on an operation evaluating value representing an actual operation of the device; and calculating the feedback value depending on the operation evaluating value. The method further includes: determining whether accuracy of control of the device performed in accordance with the control parameter satisfies a predetermined accuracy condition; controlling the device in accordance with the control parameter when the predetermined accuracy condition is satisfied; and controlling the device in accordance with the corrected control parameter when the predetermined accuracy condition is not satisfied.

According to still another aspect, a non-transitory recording medium that stores a computer program for controlling a predetermined device of a vehicle is provided. The computer program includes instructions that cause a processor mounted on the vehicle to execute a process including: inputting at least one operating-condition parameter indicating an operating condition of the device into a learning model to calculate a control parameter indicating a control condition for causing the device to perform a desired operation corresponding to the at least one operating-condition parameter; correcting the control parameter so as to achieve the control condition, based on a feedback value depending on an operation evaluating value representing an actual operation of the device; and calculating the feedback value depending on the operation evaluating value. The process further includes: determining whether accuracy of control of the device performed in accordance with the control parameter satisfies a predetermined accuracy condition; controlling the device in accordance with the control parameter when the predetermined accuracy condition is satisfied; and controlling the device in accordance with the corrected control parameter when the predetermined accuracy condition is not satisfied.

The vehicle controller according to the present invention has an advantageous effect of being able to achieve sufficient accuracy of control even with an insufficiently trained learning model used for controlling a device of a vehicle.

DESCRIPTION OF EMBODIMENTS

Hereinafter, a vehicle controller for controlling a vehicle, and a method and a computer program therefor used by such a vehicle controller will be described with reference to the accompanying drawings. The vehicle controller inputs one or more operating-condition parameters into a learning model configured by a machine learning system, and thereby calculates a control parameter indicating a control condition for causing a control-target device, such as the engine mounted on the vehicle, to perform a desired operation. The operating-condition parameters indicate an operating condition of the control-target device, such as driver operations, the state of the vehicle, or the situation around the vehicle. When the learning model is insufficiently trained, the vehicle controller corrects the control parameter, which is calculated using the learning model, by means of feedback control, based on an operation evaluating value representing an actual operation of the control-target device, and controls the control-target device in accordance with the corrected control parameter. In addition, the vehicle controller stores a combination of the operating-condition parameters and the control parameter that is to be calculated from the operating-condition parameters, as training data used for training of the learning model. When at least a predetermined number of pieces of training data are stored, the vehicle controller uses the training data to train the learning model, aiming at improving the accuracy of the control parameter calculated by the learning model. When the accuracy of the control parameter calculated by the learning model satisfies a predetermined accuracy condition, the vehicle controller directly uses the control parameter for controlling the control-target device without applying the feedback control, thereby improving response characteristics and reducing computational burdens.

In the following embodiment, assume that the control-target device of the vehicle controller is an engine. However, the control-target device of the vehicle controller is not limited to an internal combustion engine (an engine), and may be, for example, an electric motor or a gearbox.

Figure 1:
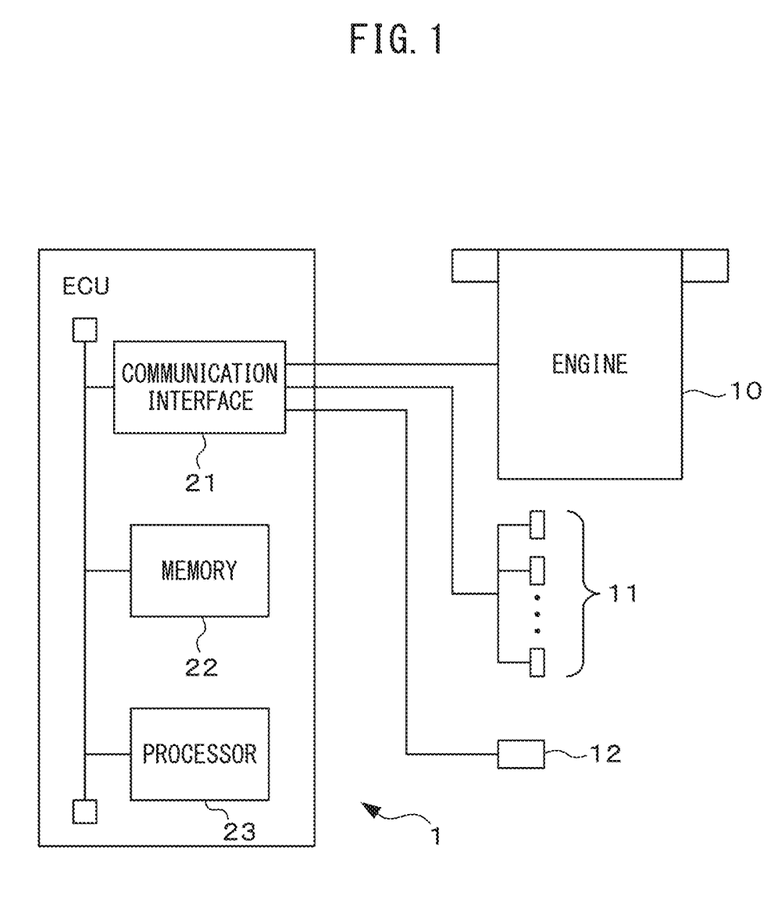
FIG. 1 illustrates the hardware configuration of an electronic control unit, which is an embodiment of the vehicle controller.

FIG. 1 illustrates the hardware configuration of an electronic control unit, which is an embodiment of the vehicle controller. In the present embodiment, the electronic control unit (ECU) 1, which controls an engine 10 (an example of the internal combustion engine) mounted on a vehicle, includes a communication interface 21, a memory 22, and a processor 23.

The communication interface 21, which is an example of a communication unit, includes an interface circuit for connecting the ECU 1 to an in-vehicle network (not illustrated). The communication interface 21 passes, to the processor 23, values sensed by and received from one or more sensors 11 mounted on the vehicle. The sensed values indicate the environment around the vehicle or the situation of the vehicle. The sensors 11 includes, for example, a thermometer to measure atmospheric temperature around the vehicle, a hygrometer to measure humidity around the vehicle, a GPS receiver to determine a measured value of the altitude of the location of the vehicle, an acceleration sensor to measure the acceleration of the vehicle, and a speed sensor to measure the speed of the vehicle. The communication interface 21 passes, to the processor 23, an operation signal received from an operating device 12 of the vehicle. The operating device is, for example, an accelerator. The operation signal indicates, for example, the accelerator position.

The memory 22, which is an example of the storing unit, includes, for example, volatile and nonvolatile semiconductor memories. The memory 22 stores various types of data used in various processes executed by the processor 23. As such data, the memory 22 stores, for example, a parameter set defining a learning model used for calculating a control parameter, training data used for training the learning model, and a reference table representing the relationship between the control parameter and driving parameters that regulate the operation of components of the engine 10. The memory 22 may also store map information indicating the locations of road features, such as lane division lines and stop lines.

The processor 23 includes one or more central processing units (CPUs) and a peripheral circuit thereof. The processor 23 may further include another arithmetic circuit, such as a logical operation unit, a numerical operation unit, or a graphics processing unit. The processor 23 controls the engine 10.

Figure 2:
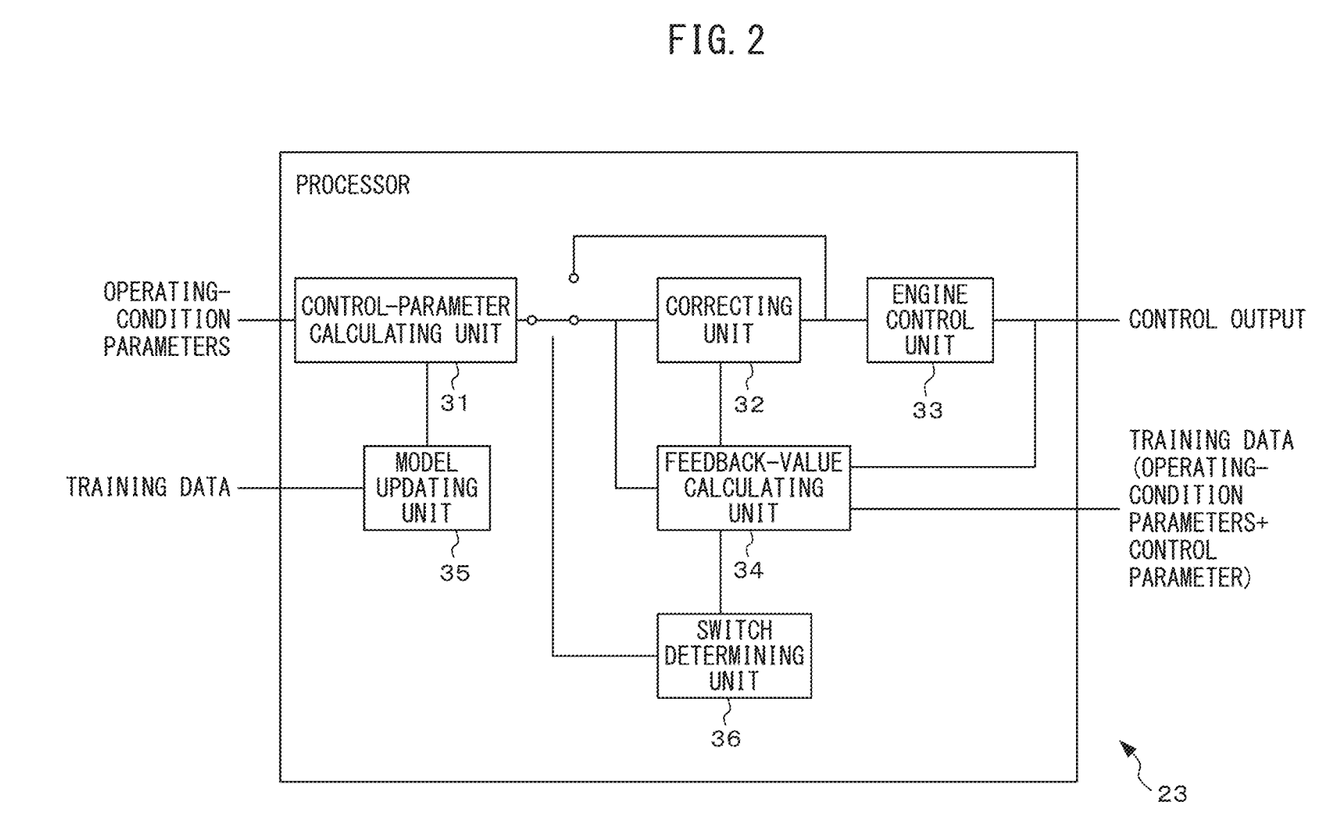
FIG. 2 is a functional block diagram of a processor of the electronic control unit, related to a vehicle control process.

FIG. 2 is a functional block diagram of the processor 23, related to a vehicle control process. The processor 23 includes a control-parameter calculating unit 31, a correcting unit 32, an engine control unit 33, a feedback-value calculating unit 34, a model updating unit 35, and a switch determining unit 36. These units included in the processor 23 are implemented by a computer program executed on the processor 23, or may be dedicated arithmetic circuits provided in the processor 23.

The control-parameter calculating unit 31 inputs one or more operating-condition parameters into the learning model every predetermined period to calculate a control parameter of the engine 10. In the present embodiment, the control-parameter calculating unit 31 uses the accelerator position, the rate of change thereof, atmospheric temperature, humidity, and altitude as the operating-condition parameters to be inputted into the learning model. According to a modified example, the control-parameter calculating unit 31 may use the accelerator position and the rate of change thereof as well as one or two of the other parameters, i.e., atmospheric temperature, humidity, and altitude as the operating-condition parameters to be inputted into the learning model. The rate of change of the accelerator position may be excluded from the operating-condition parameters. The control-parameter calculating unit 31 calculates, as the control parameter, a target value of torque (hereafter, a "target torque value") outputted from the engine 10. The control-parameter calculating unit 31 may acquire the atmospheric temperature, humidity, and altitude from the sensors 11 via the communication interface 21, and acquire the accelerator position from the operating device via the communication interface 21. The control-parameter calculating unit 31 may divide the difference between the preceding and current accelerator positions by the predetermined period to calculate the rate of change of the accelerator position. The fact that the operating-condition parameters used for calculating the control parameter include information indicating the environment around the vehicle, such as atmospheric temperature, humidity, and altitude, as described above allows the control-parameter calculating unit 31 to calculate a target torque value so that a desired torque may be outputted even if the environment around the vehicle changes.

In the present embodiment, the control-parameter calculating unit 31 uses a neural network configured by a multi-layered perceptron as the learning model. More specifically, the learning model includes an input layer to receive an input of the operating-condition parameters, an output layer to output the control parameter, and one or more intermediate layers (also referred to as hidden layers) provided between the input and output layers. Each intermediate layer includes multiple nodes that each perform a fully-connected operation on values outputted from the nodes included in the immediately preceding layer. The output layer performs, for example, a sigmoid operation on an output from the immediately preceding layer to calculate the control parameter.

Every time calculating a control parameter (in the present embodiment, a target torque value), the control-parameter calculating unit 31 outputs the control parameter to the correcting unit 32 (when the feedback control is applied) or to the engine control unit 33 (when the feedback control is not applied). The control-parameter calculating unit 31 outputs the operating-condition parameters used for calculating the control parameter together with the calculated control parameter to the feedback-value calculating unit 34.

During the application of the feedback control, the correcting unit 32 corrects, every time receiving a control parameter from the control-parameter calculating unit 31, the control parameter using a feedback value received from the feedback-value calculating unit 34 so as to achieve the control condition indicated by the control parameter. In the present embodiment, the feedback value is calculated by multiplying the difference (TP-TR) between a target torque value (TP) and an estimated actual output value of torque (TR) by a predetermined factor, as will be described below in detail. The correcting unit 32 adds the feedback value to the control parameter to correct the control parameter, and outputs the corrected control parameter to the engine control unit 33. In this way, the corrected control parameter outputted from the correcting unit 32 to the engine control unit 33 changes depending on the feedback value, whereas the control parameter itself (in the present embodiment, the target torque value) calculated by the control-parameter calculating unit 31 is not changed by the correcting unit 32. Thus, the engine 10 is controlled so that the actual output value of torque of the engine 10 may approach the target torque value.

The engine control unit 33, which is an example of the device control unit, controls the engine 10 in accordance with the corrected control parameter received from the correcting unit 32 or the control parameter received from the control-parameter calculating unit 31. In the present embodiment, the engine control unit 33 refers to the reference table stored in the memory 22. When the feedback control is applied, the engine control unit 33 determines one or more driving parameters of the engine 10 (e.g., an ignition timing, the amount of fuel injection, an air-fuel ratio, and the degrees and timings of opening and closing of inlet and outlet valves) corresponding to the corrected control parameter received from the correcting unit 32. When the feedback control is not applied, the engine control unit 33 determines one or more driving parameters of the engine 10 corresponding to the control parameter received from the control-parameter calculating unit 31. The engine control unit 33 may determine the driving parameters of the engine 10 by referring to parameters indicating the state of the engine 10, such as its engine speed and internal pressures of cylinders included in the engine 10, as well as the received value of the control parameter. The engine control unit 33 may determine the driving parameters of the engine 10 in accordance with another technique to determine driving parameters from a control parameter.

The engine control unit 33 generates a control signal for controlling the engine 10 in accordance with the determined driving parameters, and outputs the control signal to the engine 10, thereby controlling the engine 10.

When the feedback control is applied, the feedback-value calculating unit 34 calculates a feedback value for correcting the control parameter, depending on an operation evaluating value. In the present embodiment, the feedback-value calculating unit 34 calculates the feedback value by multiplying the difference (hereafter, the "torque deviation") between the preceding value of the control parameter (target torque value) received from the control-parameter calculating unit 31 and the actual output value of torque by a predetermined factor (e.g., a positive factor less than one). The actual output value of torque is an example of the operation evaluating value. The feedback-value calculating unit 34 acquires the actual output value of torque, for example, from a torque sensor attached to the engine 10 via the communication interface 21. Alternatively, the feedback-value calculating unit 34 may estimate the actual output value of torque, based on the acceleration received from the acceleration sensor via the communication interface 21 and the weight of the vehicle.

The feedback-value calculating unit 34 outputs the calculated feedback value to the correcting unit 32.

In addition, the feedback-value calculating unit 34 determines whether the control-target device performs a desired operation in accordance with the corrected control parameter, based on the operation evaluating value, and stores a combination of the corrected control parameter and the operating-condition parameters used for calculating the uncorrected control parameter in the memory 22 as a piece of training data when the control-target device performs the desired operation.

In the present embodiment, when the absolute value of the torque deviation is within predetermined tolerance, it is determined that the engine 10 outputs torque that is the same as the target torque in accordance with the corrected control parameter. The feedback-value calculating unit 34 stores, in the memory 22, a combination of the corrected control parameter and the operating-condition parameters used for calculating the uncorrected control parameter (target torque value) as a piece of training data to be used for training the learning model. The feedback-value calculating unit 34 increments, by one, a count value representing the number of pieces of training data stored in the memory 22. The feedback-value calculating unit 34 notifies the switch determining unit 36 of the torque deviation regardless of whether the feedback control is applied.

The model updating unit 35 refers to the count value to determine whether the number of pieces of training data stored in the memory 22 has reached a predetermined number. When the number of pieces of training data stored in the memory 22 is not less than the predetermined number, the model updating unit 35 trains the learning model by using the training data stored in the memory 22 in accordance with a predetermined training technique, thereby updating the learning model. For example, when the learning model is a neural network configured by a multi-layered perceptron as described above, the model updating unit 35 updates, for example, weight factors of the nodes of the intermediate layers of the neural network in accordance with backpropagation, thereby updating the learning model. At this update, the model updating unit 35 may update weight factors of the nodes of all of the intermediate layers, or weight factors of particular nodes out of the nodes of all or some of the intermediate layers. For the second and subsequent times, the model updating unit 35 may update the learning model every time the number of pieces of training data stored in the memory 22 after the preceding update of the learning model reaches the predetermined number. At each update, the model updating unit 35 may use all the training data stored in the memory 22 or a predetermined number of pieces of training data in order from newest to train the learning model. Alternatively, after training of the learning model, the model updating unit 35 may delete some or all of the training data used in the training from the memory 22. In the case that the feedback control is not applied, the model updating unit 35 may omit to update the learning model even if the number of pieces of training data stored in the memory 22 reaches the predetermined number, since it is assumed that the accuracy of the control parameter calculated by the learning model is sufficient.

The model updating unit 35 may perform a process to update the learning model in parallel with control of the engine 10. However, to reduce the computational burden of the processor 23, the model updating unit 35 may perform the process to update the learning model at the timing of the first turn-off of an ignition switch after the number of pieces of training data stored in the memory 22 reaches the predetermined number.

After updating the learning model, the model updating unit 35 stores the parameter set representing the updated learning model in the memory 22. Then, the model updating unit 35 notifies the control-parameter calculating unit 31 that the updated learning model is usable, causing the control-parameter calculating unit 31 to calculate the control parameter with the updated learning model after the update of the learning model.

Figure 3:
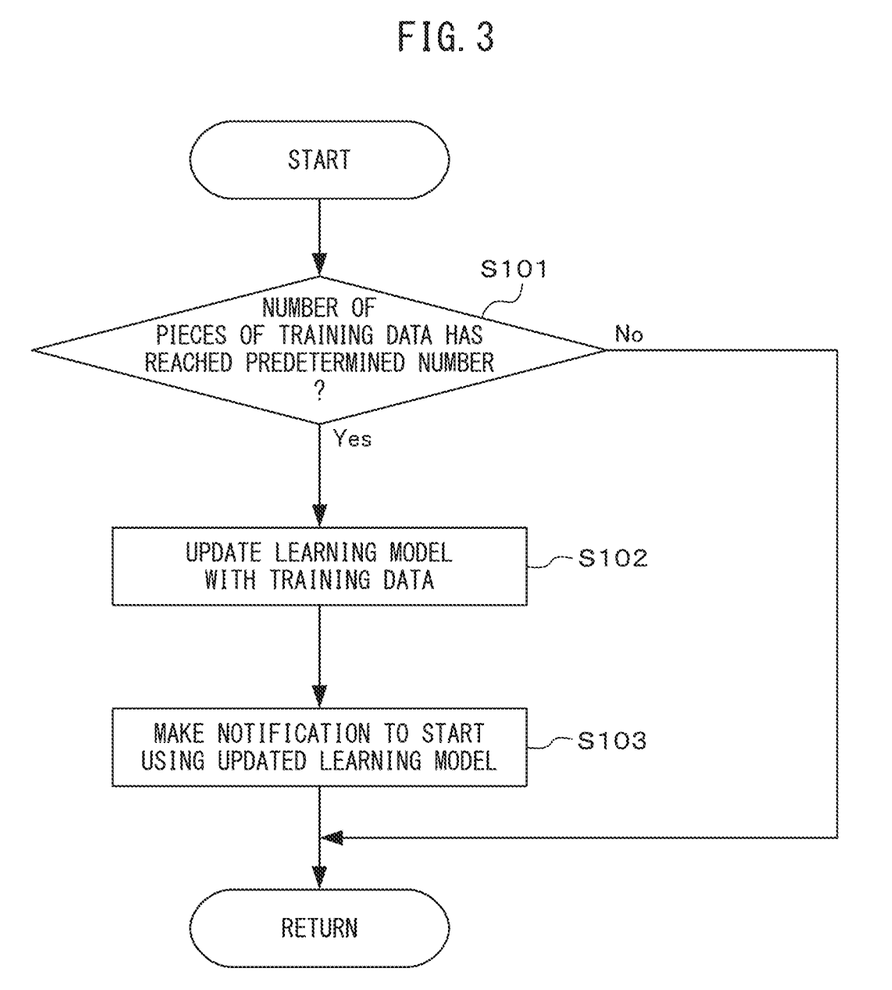
FIG. 3 is an operation flowchart of a process to update a learning model in the vehicle control process.

FIG. 3 is an operation flowchart of the process to update the learning model in the vehicle control process.

The model updating unit 35 of the processor 23 determines whether the number of pieces of training data stored in the memory 22 has reached a predetermined number (step S101). When the number of pieces of training data is less than the predetermined number (No in Step S101), the model updating unit 35 terminates the process to update the learning model.

When the number of pieces of training data stored in the memory 22 is not less than the predetermined number (Yes in Step S101), the model updating unit 35 trains the learning model by using the training data stored in the memory 22 in accordance with a predetermined training technique, thereby updating the learning model (step S102).

The model updating unit 35 then causes the control-parameter calculating unit 31 of the processor 23 to start using the updated learning model (step S103). The processor 23 then terminates the process to update the learning model.

The switch determining unit 36 determines whether the accuracy of control of the control-target device (in the present embodiment, the engine 10) performed in accordance with the control parameter (in the present embodiment, the target torque value) calculated by the learning model used by the control-parameter calculating unit 31 satisfies a predetermined accuracy condition. When the predetermined accuracy condition is satisfied, the switch determining unit 36 stops the application of the feedback control. For example, the switch determining unit 36 determines when the absolute value of the rate of change of the accelerator position is not less than a predetermined threshold (hereafter, such a time is referred to as a "change of the accelerator position" for convenience of description). For each of the latest changes (e.g., 10 to 100) of the accelerator position, the switch determining unit 36 determines whether the absolute value of the torque deviation obtained at the change of the accelerator position is within predetermined tolerance. The fact that the torque deviations for the changes of the accelerator position, i.e., for a transient state in which torque required by the engine 10 varies are used for determining the accuracy of the control parameter, which is obtained by the learning model, as described above allows the switch determining unit 36 to appropriately evaluate the accuracy of the control parameter. In the case that the learning model is updated, the switch determining unit 36 may determine whether the absolute value of the torque deviation is within the predetermined tolerance for each of the latest changes of the accelerator position after the update. When the feedback control is applied and the ratio of the number of times in which the absolute value of the torque deviation is within the predetermined tolerance to the number of latest changes of the accelerator position is not less than a feedback stop threshold (e.g., 80% to 90%), the accuracy of control of the engine 10 based on the control parameter calculated by the learning model would be sufficient to eliminate the need for the feedback control. Thus, the switch determining unit 36 determines that the predetermined accuracy condition is satisfied, and causes the control parameter outputted from the control-parameter calculating unit 31, i.e., calculated using the learning model to be directly inputted into the engine control unit 33. This stops the application of the feedback control, and thus improves the response speed of engine control and reduces the computational burden of the processor 23. The switch determining unit 36 may further request the model updating unit 35 to stop updating the learning model.

In contrast, when the feedback control is not applied and the ratio of the number of times in which the absolute value of the torque deviation is within the predetermined tolerance to the number of latest changes of the accelerator position is not greater than a feedback restart threshold (e.g., 40% to 60%), the feedback control would be necessary to achieve sufficient accuracy of control of the engine 10. Thus, the switch determining unit 36 determines that the predetermined accuracy condition is not satisfied, and causes the control parameter outputted from the control-parameter calculating unit 31 to be corrected by the correcting unit 32 and then inputted into the engine control unit 33. This starts the application of the feedback control, and thus allows the ECU 1 to keep the accuracy of control of the engine 10 sufficiently high even with an insufficiently trained learning model. The switch determining unit 36 may further request the model updating unit 35 to restart updating the learning model. The feedback restart threshold is preferably set to be less than the feedback stop threshold. This prevents frequent switches between application and non-application of the feedback control.

Figure 4:
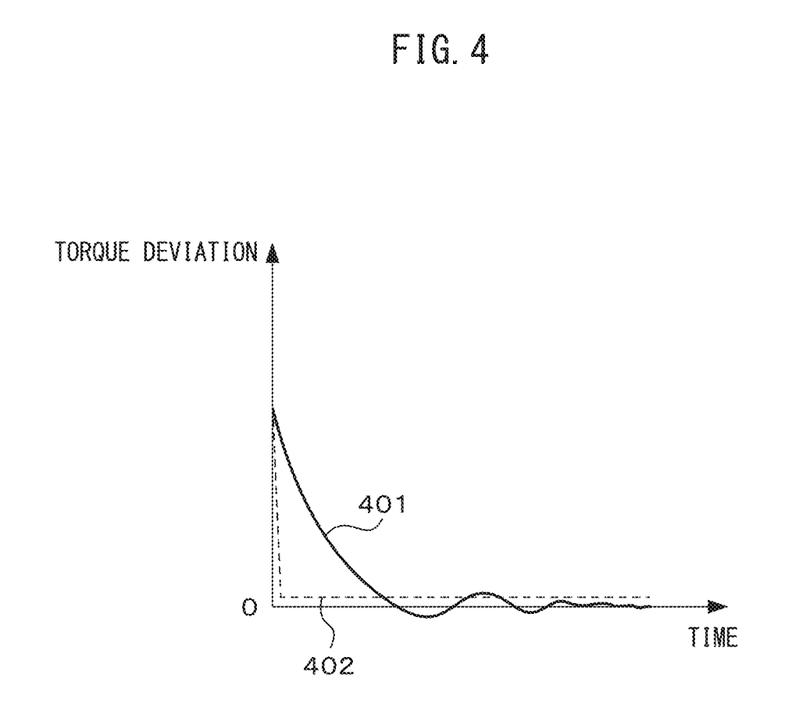
FIG. 4 schematically illustrates time-varying changes of torque deviation between actual output values of torque and target values of torque calculated by the learning model for the cases with and without feedback control.

FIG. 4 schematically illustrates time-varying changes of the torque deviation for the cases with and without the feedback control. The abscissa and ordinate of FIG. 4 represents time and torque deviation, respectively. In FIG. 4, the waveform 401 represents time-varying changes of the torque deviation for the case that the learning model is insufficiently trained and the feedback control is applied. The waveform 402 represents time-varying changes of the torque deviation for the case that the learning model is sufficiently trained and the feedback control is no longer applied.

As indicated by the waveform 401, when the learning model is insufficiently trained, the absolute value of the torque deviation is relatively large at the start, but gradually decreases with the passage of time due to the application of the feedback control. This suggests that the ECU 1 can control the engine 10 even with the insufficiently trained learning model so that a desired torque corresponding to the operating-condition parameters, such as the accelerator position, may be outputted.

As indicated by the waveform 402, when the learning model is sufficiently trained, the absolute value of the torque deviation sufficiently decreases from the start even without the application of the feedback control. This suggests that the ECU 1 can control the engine 10, when the learning model is sufficiently trained, so that a desired torque corresponding to the operating-condition parameters, such as the accelerator position, may be immediately outputted.

Figure 5:
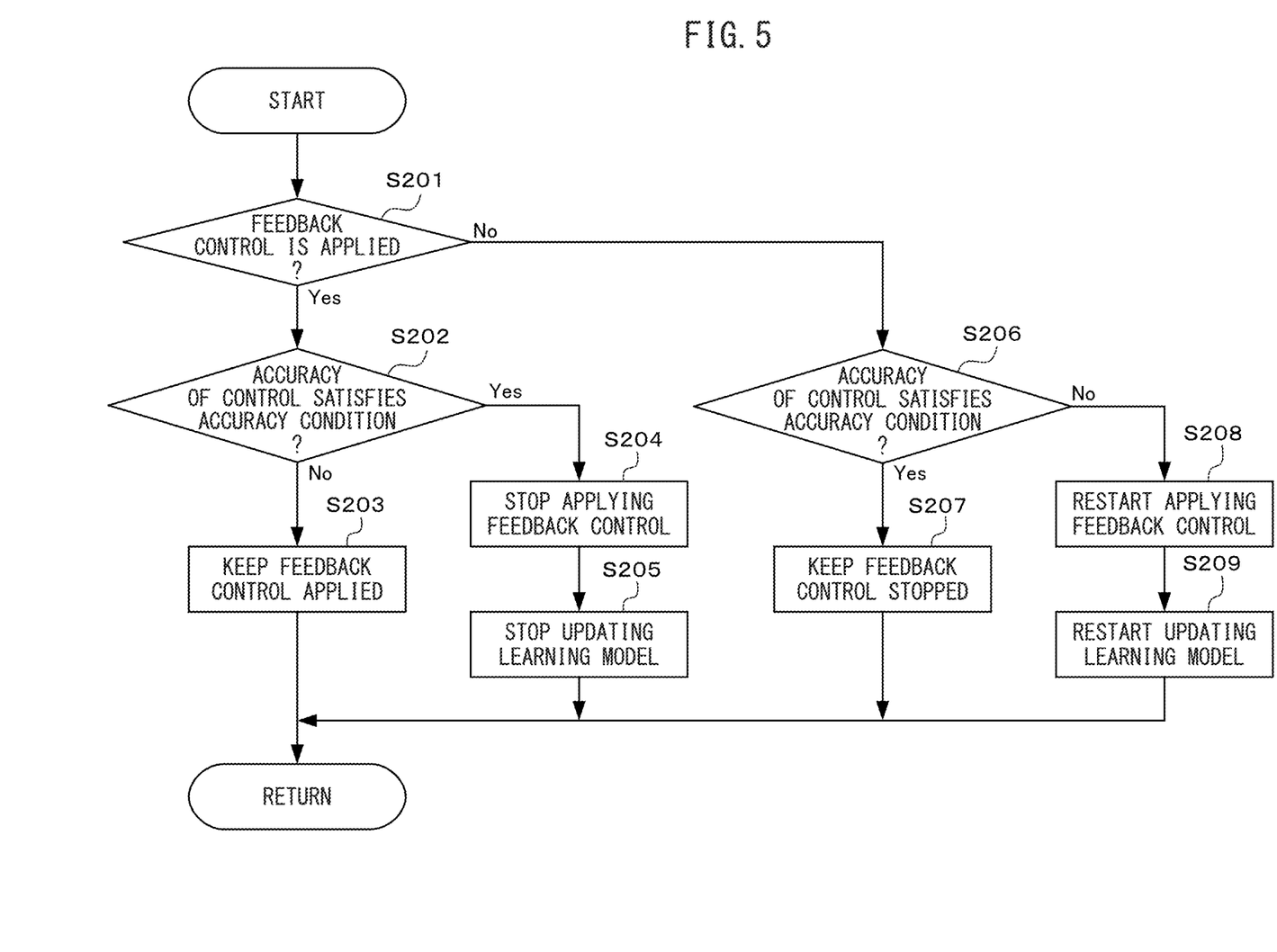
FIG. 5 is an operation flowchart of a process to determine whether to switch between application and non-application of the feedback control.

FIG. 5 is an operation flowchart of a process to determine whether to switch between application and non-application of the feedback control. The switch determining unit 36 of the processor 23 may perform the determining process in accordance with the following operation flowchart every time torque deviations for a predetermined number of changes of the accelerator position are obtained after update of the learning model.

The switch determining unit 36 of the processor 23 determines whether the feedback control is applied (step S201). When the feedback control is applied (Yes in Step S201), the switch determining unit 36 determines whether the accuracy of control of the engine 10 performed in accordance with the control parameter calculated by the learning model satisfies a predetermined accuracy condition, based on the torque deviations for the latest changes of the accelerator position (step S202). When the predetermined accuracy condition is not satisfied (No in Step S202), the switch determining unit 36 determines to keep the feedback control applied until the next update of the learning model (step S203).

When the predetermined accuracy condition is satisfied (Yes in Step S202), the switch determining unit 36 stops the application of the feedback control and causes the control parameter outputted from the control-parameter calculating unit 31 to be directly inputted into the engine control unit 33 (step S204). The switch determining unit 36 also requests the model updating unit 35 to stop updating the learning model (step S205).

After step S203 or S205, the processor 23 terminates the determining process.

When the feedback control is not applied in Step S201 (No in Step S201), the switch determining unit 36 determines whether the accuracy of control of the engine 10 performed in accordance with the control parameter calculated by the learning model satisfies the predetermined accuracy condition, based on the torque deviations for the latest changes of the accelerator position (step S206). When the predetermined accuracy condition is satisfied (Yes in Step S206), the switch determining unit 36 determines to keep the feedback control stopped (step S207).

When the predetermined accuracy condition is not satisfied (No in Step S206), the switch determining unit 36 restarts applying the feedback control and causes the control parameter outputted from the control-parameter calculating unit 31 to be corrected by the correcting unit 32 and then inputted into the engine control unit 33 (step S208). The switch determining unit 36 also requests the model updating unit 35 to restart updating the learning model (step S209).

After step S207 or S209, the processor 23 terminates the determining process.

As has been described above, the vehicle controller uses a learning model configured by a machine learning system to calculate a control parameter of the control-target device mounted on a vehicle. While the learning model is insufficiently trained, the vehicle controller applies the feedback control to the control parameter calculated by the learning model, which allows for maintaining the accuracy of control of the control-target device without decreasing it even with the insufficiently trained learning model. When the learning model is sufficiently trained, the vehicle controller stops applying the feedback control, which allows for improving the response speed of control of the control-target device and reducing the computational burden. In this way, the vehicle controller can achieve both maintaining the accuracy of control of the control-target device, and reducing the computational burden and improving the response characteristics. Additionally, the fact that the operating-condition parameters inputted into the learning model, which calculates the control parameter, include parameters indicating the environment around the vehicle or the characteristics of driving operations of a driver allows for calculating the control parameter, taking account of the environment around the vehicle or the characteristics of the driving operations, which enables the vehicle controller to further improve the accuracy of control of the control-target device.

To travel a vehicle at a constant speed, it is preferable not to change the accelerator position too much. However, some drivers may excessively change the accelerator position, failing to keep the vehicle speed constant. For this reason, according to a modified example, the learning model used by the control-parameter calculating unit 31 may be trained to output such an accelerator position (hereafter, a "smoothing accelerator position") as to keep the vehicle speed constant when a driver is assumed to try to keep the vehicle speed constant. In this modified example, the smoothing accelerator position is an example of the control parameter.

In this case, the control-parameter calculating unit 31 determines whether the driver is assumed to try to keep the vehicle speed constant, based on traffic light information, the amount of change in the speed of another vehicle traveling ahead of the control-target vehicle (hereafter, the former and latter vehicles are referred to as a "second vehicle" and the "target vehicle," respectively), and information on a lane change made by a second vehicle traveling near the target vehicle (hereafter, "lane change information"). When the driver is assumed to try to keep the vehicle speed constant, the control-parameter calculating unit 31 calculates the smoothing accelerator position with the learning model. When the driver is not in a situation that he/she can keep the vehicle speed constant, the processor 23 may control the engine 10 in accordance with the above-described embodiment.

The traffic light information is obtained, for example, by detecting a traffic light from an image (hereafter, an "outside image") obtained by a camera mounted on the target vehicle so as to capture a region around the target vehicle, e.g., one in front of the target vehicle and by identifying the state of lighting of the detected traffic light (e.g., green or red). For example, the control-parameter calculating unit 31 can determine the state of lighting of a traffic light near the target vehicle, e.g., one ahead of the target vehicle and obtain the result as the traffic light information by inputting an outside image acquired via the communication interface 21 into a classifier that has been trained to detect a traffic light and to identify the state of lighting of the traffic light. As such a classifier, the control-parameter calculating unit 31 may use, for example, a "deep neural network" (DNN) having a convolutional neural network (CNN) architecture. When no traffic light is detected from the outside image, the traffic light information may include information indicating that no traffic light is detected.

The amount of change in the speed of a second vehicle traveling ahead of the target vehicle is obtained, for example, by tracking the second vehicle, which is detected from each of time series outside images obtained in a preceding predetermined period. In this case, for example, every time acquiring an outside image from the camera via the communication interface 21, the control-parameter calculating unit 31 inputs the outside image into a classifier that has been trained to detect a vehicle, thereby detecting a second vehicle near the target vehicle. As such a classifier, the control-parameter calculating unit 31 may use, for example, a DNN having a CNN architecture. A single classifier may be trained to detect both a traffic light and a vehicle, and used by the control-parameter calculating unit 31 to detect a traffic light and a second vehicle from an outside image.

The control-parameter calculating unit 31 refers to, for example, internal parameters stored in the memory 22, such as the mounted position, focal length, and orientation of the camera, to transform the outside images into aerial images by viewpoint transformation, thereby determining the locations of the second vehicle relative to the target vehicle for the respective times of generation of the outside images. When the target vehicle includes a range sensor, such as a LiDAR sensor or radar, the control-parameter calculating unit 31 may use the distance to the detected second vehicle measured by the range sensor to determine of the relative locations of the second vehicle. The control-parameter calculating unit 31 then refers to information indicating the locations and orientations of the target vehicle for the respective times of generation of the outside images to perform a predetermined tracking process on the locations of the detected second vehicle in the respective aerial images, thereby determining a trajectory of the second vehicle. The locations and orientations of the target vehicle for the respective times of generation of the outside images can be determined, for example, by performing a location estimating process, in which a road feature located near the target vehicle and indicated by the map information is projected onto each image and the location and orientation of the target vehicle is estimated so that the road feature may coincide with a corresponding road feature represented in the image. The control-parameter calculating unit 31 may estimate previous and current speeds of the second vehicle, based on the determined trajectory, and calculate the difference between the estimated previous and current speeds of the second vehicle as the amount of change in the vehicle speed. The control-parameter calculating unit 31 may calculate the amount of change in the speed relative to the target vehicle as the amount of change in the speed of the second vehicle.

To obtain the lane change information, the control-parameter calculating unit 31 refers to, for example, the trajectory of the second vehicle determined as described above and the location of a lane division line indicated by the map information, and determines that the second vehicle changes lanes when the trajectory of the second vehicle crosses the lane division line. The control-parameter calculating unit 31 may count the number of lane changes made by the second vehicle in a preceding predetermined period as the lane change information. Alternatively, the control-parameter calculating unit 31 may obtain, as the lane change information, information indicating the fact that the second vehicle has moved from a lane adjoining the lane on which the target vehicle is traveling (the former and latter lanes are simply referred to as an "adjoining lane" and the "target lane," respectively) to the target lane or from the target lane to an adjoining lane in a preceding predetermined period.

The control-parameter calculating unit 31 may acquire the traffic light information, the amount of change in the speed of the second vehicle, and the lane change information, or some of them from another device mounted on the target vehicle, e.g., from an ECU for driving assistance via the communication interface 21.

The control-parameter calculating unit 31 determines that the driver is in a situation that he/she is assumed to try to keep the vehicle speed constant, for example, when all of the following conditions are satisfied: the traffic light information indicates that the state of lighting of the traffic light ahead of the target vehicle is green or that there is no traffic light near the target vehicle; the amount of change in the speed of the second vehicle is not greater than a predetermined threshold; and the lane change information indicates that the second vehicle has not changed lanes. The control-parameter calculating unit 31 then calculates the smoothing accelerator position with the learning model. In contrast, the control-parameter calculating unit 31 determines that the driver is not in the situation that he/she is assumed to try to keep the vehicle speed constant, when one of the following conditions is satisfied: the traffic light information indicates that the state of lighting of the traffic light ahead of the target vehicle is other than green; the amount of change in the speed of the second vehicle is greater than the predetermined threshold; and the lane change information indicates that the second vehicle will change lanes.

According to this modified example, for example, the accelerator position, the rate of change thereof, the frequency of accelerator operations, and the frequency of brake operations, or some of them are used as the operating-condition parameters to be inputted into the learning model. Of these, the accelerator position and the rate of change thereof may be obtained as in the above-described embodiment.

The frequency of accelerator operations is calculated, for example, as the number of times in which the absolute value of the rate of change of the accelerator position is not less than a predetermined value or the number of local maxima of the time-varying amount of pressing-down of the accelerator pedal in a preceding predetermined period. Similarly, the frequency of brake operations is calculated, for example, as the number of times in which the amount of pressing-down of the brake pedal is changed by a predetermined amount or more or the number of local maxima of the time-varying amount of pressing-down of the brake pedal in a preceding predetermined period.

The control-parameter calculating unit 31 can use a neural network configured by a multi-layered perceptron as the learning model, as in the above-described embodiment. Alternatively, the control-parameter calculating unit 31 may use a recurrent neural network, which retains and recursively uses an internal state, as the learning model. The control-parameter calculating unit 31 outputs the smoothing accelerator position, which is calculated by the learning model in response to the operating-condition parameters being inputted, to the correcting unit 32 (when the feedback control is applied) or to the engine control unit 33 (when the feedback control is not applied).

In this modified example, when the feedback control is applied, the correcting unit 32 adds a feedback value, which represents the amount of correction of the smoothing accelerator position and is calculated by the feedback-value calculating unit 34, to the smoothing accelerator position to correct the smoothing accelerator position. The correcting unit 32 then outputs the corrected smoothing accelerator position to the engine control unit 33.

In this modified example, the engine control unit 33 refers to a reference table representing the relationship between the smoothing accelerator position and the one or more driving parameters of the engine 10 to determine the one or more driving parameters corresponding to the smoothing accelerator position received from the control-parameter calculating unit 31 (when the feedback control is not applied) or from the corrected smoothing accelerator position received from the correcting unit 32 (when the feedback control is applied). The engine control unit 33 then controls the engine 10 in accordance with the determined driving parameters.

In this modified example, the feedback-value calculating unit 34 calculates the feedback value, based on measured values of the speed of the target vehicle acquired from a vehicle speed sensor mounted on the target vehicle via the communication interface 21 and the smoothing accelerator position received from the control-parameter calculating unit 31. For example, the feedback-value calculating unit 34 calculates the amount of change in the vehicle speed, which is the difference obtained by subtracting a measured value of a previous vehicle speed from a measured value of the current vehicle speed. This amount of change in the vehicle speed is an example of the operation evaluating value. The feedback-value calculating unit 34 then refers to a correction-amount table representing the relationship between the amount of change in the vehicle speed, the smoothing accelerator position, and the amount of correction of the smoothing accelerator position to determine the amount of correction of the smoothing accelerator position corresponding to the calculated amount of change in the vehicle speed and the preceding smoothing accelerator position received from the control-parameter calculating unit 31. The feedback-value calculating unit 34 outputs, as the feedback value, the determined amount of correction of the smoothing accelerator position to the correcting unit 32.

When the absolute value of the amount of change in the vehicle speed is not greater than a predetermined value, the feedback-value calculating unit 34 determines that the engine 10 operates in accordance with the corrected smoothing accelerator position so as to keep the vehicle speed constant. In this case, the feedback-value calculating unit 34 stores a combination of the smoothing accelerator position and the operating-condition parameters used for calculating the smoothing accelerator position in the memory 22 as training data. When a recurrent neural network is used as the learning model, the feedback-value calculating unit 34 may store combinations of the smoothing accelerator position and the operating-condition parameters used for calculating the smoothing accelerator position for the times when the absolute value of the amount of change in the vehicle speed is not greater than a predetermined value and for certain periods immediately before the respective times in the memory 22 as training data.

According to this modified example, the switch determining unit 36 determines whether the absolute value of the amount of change in the vehicle speed obtained at each of the latest changes of the accelerator position is within predetermined tolerance. When the feedback control is applied and the ratio of the number of times in which the absolute value of the amount of change in the vehicle speed is within the predetermined tolerance to the number of latest changes of the accelerator position is not less than the feedback stop threshold, the engine 10 would be controlled in accordance with the smoothing accelerator position calculated by the learning model so as to keep the vehicle speed constant with such accuracy as to eliminate the need for the feedback control. Thus, the switch determining unit 36 determines that the predetermined accuracy condition is satisfied, and causes the smoothing accelerator position outputted from the control-parameter calculating unit 31 to be directly inputted into the engine control unit 33. The switch determining unit 36 may further request the model updating unit 35 to stop updating the learning model.

In contrast, when the feedback control is not applied and the ratio of the number of times in which the absolute value of the amount of change in the vehicle speed is within the predetermined tolerance to the number of latest changes of the accelerator position is not greater than the feedback restart threshold, the feedback control would be necessary to control the engine 10 so as to keep the vehicle speed constant. Thus, the switch determining unit 36 determines that the predetermined accuracy condition is not satisfied, and causes the smoothing accelerator position outputted from the control-parameter calculating unit 31 to be corrected by the correcting unit 32 and then inputted into the engine control unit 33. This starts the application of the feedback control, and thus allows the processor 23 to control the engine 10 so as to keep the vehicle speed constant even with an insufficiently trained learning model. The switch determining unit 36 may further request the model updating unit 35 to restart updating the learning model.

According to this modified example, the processor 23 can control the engine 10 so as to keep the vehicle speed constant when the driver is assumed to try to keep the vehicle speed constant, regardless of driving characteristics of the driver.

A computer program for achieving the functions of the units of the processor 23 of the vehicle controller according to the above-described embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. A vehicle controller for controlling a predetermined device of a vehicle, comprising:

a processor configured to: input at least one operating-condition parameter indicating an operating condition of the device into a learning model to calculate a control parameter indicating a control condition for causing the device to perform a desired operation corresponding to the at least one operating-condition parameter;
- correct the control parameter so as to achieve the control condition, based on a feedback value depending on an operation evaluating value representing an actual operation of the device;
- calculate the feedback value depending on the operation evaluating value;
- determine whether accuracy of control of the device performed in accordance with the control parameter satisfies a predetermined accuracy condition;
- control the device in accordance with the control parameter when the predetermined accuracy condition is satisfied; and
- control the device in accordance with the corrected control parameter when the predetermined accuracy condition is not satisfied.

2. The vehicle controller according to claim 1, wherein the processor determines whether the device performs the desired operation in accordance with the corrected control parameter, based on the operation evaluating value, and stores a combination of the control parameter or the corrected control parameter and the at least one operating-condition parameter used for calculating the control parameter in a memory as a piece of training data when the device performs the desired operation, and the processor is further configured to train, when the number of pieces of training data stored in the memory is not less than a predetermined number, the learning model by using the predetermined number of pieces of training data stored in the memory, thereby updating the learning model, wherein after updating the learning model, the processor calculates the control parameter with the updated learning model.

3. The vehicle controller according to claim 1, wherein the device is an internal combustion engine,
the control parameter is a target value of torque outputted from the internal combustion engine, and
the at least one operating-condition parameter includes at least one parameter among atmospheric temperature around the vehicle, humidity around the vehicle, and altitude of the location of the vehicle.

4. A method for controlling a predetermined device of a vehicle, comprising:
- inputting at least one operating-condition parameter indicating an operating condition of the device into a learning model to calculate a control parameter indicating a control condition for causing the device to perform a desired operation corresponding to the at least one operating-condition parameter;
- correcting the control parameter so as to achieve the control condition, based on a feedback value depending on an operation evaluating value representing an actual operation of the device;
- calculating the feedback value depending on the operation evaluating value;
- determining whether accuracy of control of the device performed in accordance with the control parameter satisfies a predetermined accuracy condition;
- controlling the device in accordance with the control parameter when the predetermined accuracy condition is satisfied; and
- controlling the device in accordance with the corrected control parameter when the predetermined accuracy condition is not satisfied.

5. A non-transitory recording medium that stores a computer program for controlling a predetermined device of a vehicle, the computer program that causes a processor mounted on the vehicle to execute a process comprising:
- inputting at least one operating-condition parameter indicating an operating condition of the device into a learning model to calculate a control parameter indicating a control condition for causing the device to perform a desired operation corresponding to the at least one operating-condition parameter;
- correcting the control parameter so as to achieve the control condition, based on a feedback value depending on an operation evaluating value representing an actual operation of the device;
- calculating the feedback value depending on the operation evaluating value;
- determining whether accuracy of control of the device performed in accordance with the control parameter satisfies a predetermined accuracy condition;
- controlling the device in accordance with the control parameter when the predetermined accuracy condition is satisfied; and
- controlling the device in accordance with the corrected control parameter when the predetermined accuracy condition is not satisfied.

* * * * *